(12) United States Patent
Hofmann

(10) Patent No.: US 10,449,598 B2
(45) Date of Patent: Oct. 22, 2019

(54) GEARWHEEL HAVING AN AXIAL UNDERCUT

(71) Applicant: Hirschvogel Umformtechnik GmbH, Denklingen (DE)

(72) Inventor: Tobias Hofmann, Stoettwang (DE)

(73) Assignee: Hirschvogel Umformtechnik GmbH, Denklingen (DE)

( * ) Notice: Subject to any disclaimer, the term of this patent is extended or adjusted under 35 U.S.C. 154(b) by 450 days.

(21) Appl. No.: 15/218,436

(22) Filed: Jul. 25, 2016

(65) Prior Publication Data

US 2017/0021406 A1  Jan. 26, 2017

(30) Foreign Application Priority Data

Jul. 23, 2015 (DE) .................. 10 2015 213 912

(51) Int. Cl.
*B21K 1/30* (2006.01)
*F16H 55/17* (2006.01)
*B21J 13/02* (2006.01)

(52) U.S. Cl.
CPC .............. *B21K 1/30* (2013.01); *B21J 13/025* (2013.01); *F16H 55/17* (2013.01); *F16H 2055/178* (2013.01)

(58) Field of Classification Search
CPC .......... B21K 1/30; B21J 13/025; F16H 55/17; F16H 2055/178
See application file for complete search history.

(56) References Cited

U.S. PATENT DOCUMENTS 6,276,180 B1 *  8/2001  Hirschvogel ............ B21J 9/025
72/115

FOREIGN PATENT DOCUMENTS

DE    10 2011 088 864 A1    6/2013

* cited by examiner

*Primary Examiner* — Ryan J. Walters
(74) *Attorney, Agent, or Firm* — Muncy, Geissler, Olds & Lowe, P.C.

(57) ABSTRACT

A method for producing a gearwheel having an axis of rotation and a tooth system. The teeth have an axial undercut on the tooth flank sides thereof. A blank is provided having a tooth system, wherein the teeth of the tooth system are provided so as to be tilted relative to the axis of rotation such that a forming tool can advance substantially fully into the tooth flank sides of the teeth through an axial linear motion along the axis of rotation. A preliminary form of the at least one axial undercut can be provided on the tooth flank sides. A first axial forming operation is performed in the form of a first axial forging blow via which a preliminary form of the at least one axial undercut is introduced on the tooth flank sides or an already existing preliminary form of an axial undercut is sized for accuracy.

15 Claims, 4 Drawing Sheets

GEARWHEEL HAVING AN AXIAL UNDERCUT

This nonprovisional application claims priority under 35 U.S.C. § 119(a) to German Patent Application No. 10 2015 213 912.3, which was filed in Germany on Jul. 23, 2015, and which is herein incorporated by reference.

BACKGROUND OF THE INVENTION

Field of the Invention

The present invention relates to a method for producing a gearwheel having a tooth system, wherein the teeth have at least one axial undercut. The present invention furthermore relates to a gearwheel produced by means of such a method.

Description of the Background Art

A large number of different methods that can be used to produce gearwheels having axial undercuts on the teeth are known from the prior art. In the prior art, a distinction is drawn, in particular, between cutting and non-cutting methods. The present invention relates to a non-cutting method for the production of gearwheels having an axial undercut, which method can advantageously be used, in particular, to produce gear ratio wheels having at least one clutch tooth system and at least one running tooth system. A non-cutting production method for a clutch tooth system of this kind is disclosed in the publication DE 10 2011 088 864 A1, for example.

In the case of gear ratio wheels of this kind, the running tooth system is often designed in such a way that the teeth of the clutch tooth system are axially accessible from only one side for a forging tool. To produce a gear ratio wheel of this kind, a hot-pressed blank without undercuts is typically provided first of all. As part of a sizing operation, radially closing sliding elements (tools that can be removed from the die) are then used in order to form the desired axial undercuts on the teeth or tooth flanks. FIG. 1 shows a schematic view of a forming tool of this kind having radially closing sliding elements for the formation of axial undercuts on clutch tooth systems.

Sliding tools of this kind are relatively complex elements, owing to which there is a certain susceptibility to faults in such sliding tools. Moreover, the division of the forging tool into axially movable parts and radially movable parts entails a certain susceptibility to faults as regards production accuracy.

SUMMARY OF THE INVENTION

It is therefore an object of the invention to provide a simpler method for producing a gearwheel having a tooth system, wherein at least one axial undercut is provided on the teeth.

A method according to an exemplary embodiment of the invention for producing a gearwheel having an axis of rotation and having at least one tooth system (in particular a gear shift tooth system), in which the teeth have at least one axial undercut on the tooth flank sides thereof, comprises at least the following steps: provision of a blank having a tooth system, wherein the teeth are provided so as to be tilted relative to the axis of rotation in such a way that a forming tool can advance substantially fully into the tooth flank sides of the teeth through an axial linear motion along the axis of rotation, wherein a preliminary form of the at least one axial undercut can already be provided on the tooth flank sides; performance of a first axial forming operation, in particular in the form of a first axial forging blow, by means of which a preliminary form of the at least one axial undercut is introduced on the tooth flank sides or an already existing preliminary form of an axial undercut is sized for accuracy; performance of a second forming operation, in particular in the form of a second forging blow, by means of which the gearwheel is bent in such a way that the teeth are bent, preferably back into the vertical, with the result that the at least one axial undercut is provided on the tooth flank sides. The forming operations are generally performed by means of a (cold, warm and/or hot) forming process, although the invention is not restricted to the forming blow mentioned by way of example.

In other words, the present invention suggests first of all providing a blank (with or without corresponding preliminary forms of undercut), which has teeth arranged obliquely or tilted relative to the movement of the forming or forging tool in such a way that a corresponding tool can be moved by means of an axial linear motion along or parallel to the axis of rotation on a tooth flank side. Thus, the teeth are designed to slope relative to the vertical or axis of rotation in such a way that the tooth flank sides are freely accessible to an axially moving tool. By means of a first axial forming operation, in particular a first axial forging blow, an axial preliminary form of undercut is then formed on the tooth flank sides, which are freely accessible in the oblique position, or an already provided preliminary form of undercut is sized for accuracy. With the aid of the second forging blow, the teeth (or preferably the entire subregion in which the teeth are arranged; i.e. the gearwheel) are then as it were bent back into the vertical (preferably a line parallel to the axis of rotation of the gearwheel), thus providing the actual axial undercut. Thus, ultimately, the present invention proposes to provide the teeth initially as it were "tilted towards" the forming or forging tool, thus enabling the subsequent axial undercut on the teeth to be introduced by an axially moving tool and, finally, enabling the axial undercut to be provided by tilting back the gearwheel.

Here, the term "axial" can be understood to mean an orientation parallel to the axis of rotation of the gearwheel. In contrast, the term "radial" can be understood to mean an orientation at right angles to the axis of rotation of the gearwheel, preferably starting from the axis of rotation. The present invention thus allows an axial undercut to be formed on the teeth, even though only axial linear movements have to be performed by the forming tools. In comparison with the known radial sliding tools for the formation of axial undercuts, the present method is significantly less complex as regards the tools and, in particular, does not require multi-part forming or forging tools, i.e. tools that can be removed from the die.

The teeth on the blank can be provided obliquely to a vertical or so as to be tilted relative to the axis of rotation at an angle greater than 10°, preferably greater than 15°, and particularly preferably at an angle of about 18°. In these angular ranges, the teeth are generally sufficiently angled to enable the (forging) tool to be moved axially without an undercut between the teeth of the gearwheel. After the second forming operation has been performed, in particular in the form of a second forging blow, the teeth have at least one axial undercut having an undercut angle of between 1.0° and 5.0°, preferably of between 1.5° and 3.5°, and particularly preferably of about 2° to the axis of rotation or to the vertical parallel to the axis of rotation.

The tooth system can be an external tooth system. It is furthermore preferred that the gearwheel is a clutch gearwheel, in particular a gear ratio wheel, preferably having at least one clutch tooth system and at least one running tooth system (cf FIG. 2). Moreover, the present invention can also particularly preferably be used with gear shift sleeves. In the case of gearwheels of this kind, the teeth are often accessible axially for a forging tool only from one side of the component since other (design) elements, e.g. a running tooth system, are often arranged on the other axial side. The present invention can therefore be used to particular advantage precisely with gearwheels of this kind. However, the present invention is not restricted to gearwheels of this kind.

The blank is advantageously provided by means of a hot pressing method, in particular by means of a forging press operation. Moreover, the first and/or second forging blow is/are preferably performed as cold sizing blows. However, it is also possible both to provide the blank by means of a warm method and also to perform the further forming operations by a warm method. Finally, it is preferred that the gearwheel is designed as an integral monobloc.

The present invention furthermore relates to a clutch gearwheel, in particular a gear ratio gearwheel produced by means of one of the methods described above.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
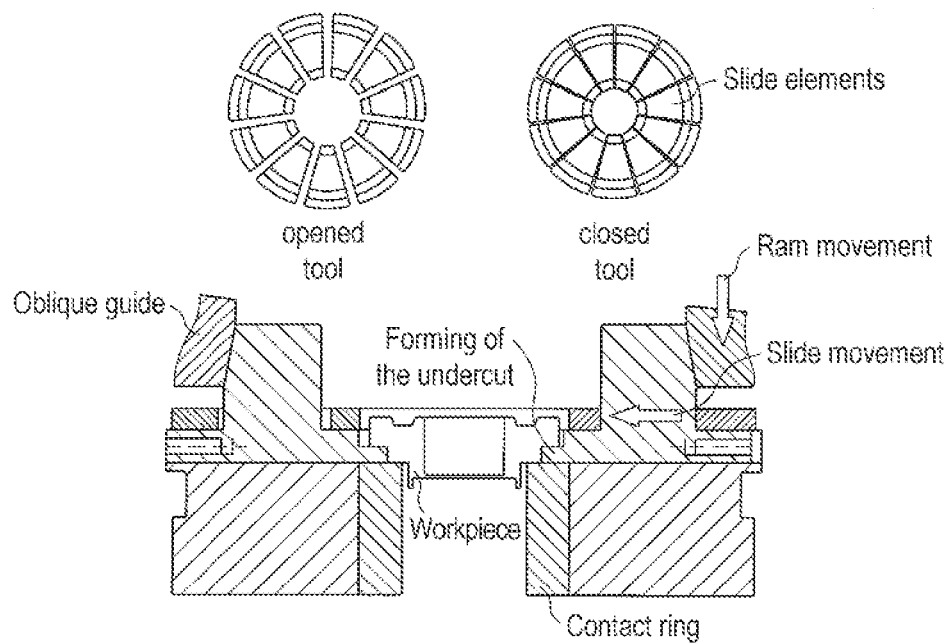
FIG. 1 shows a schematic view of a forging tool known in the prior art, having radially closing sliding elements for the formation of axial undercuts on clutch tooth systems.

FIG. 1 shows a schematic view of a forging tool known in the conventional art, having radially closing sliding elements for the formation of axial undercuts, in particular on clutch tooth systems of a gear ratio wheel.

Figure 2:
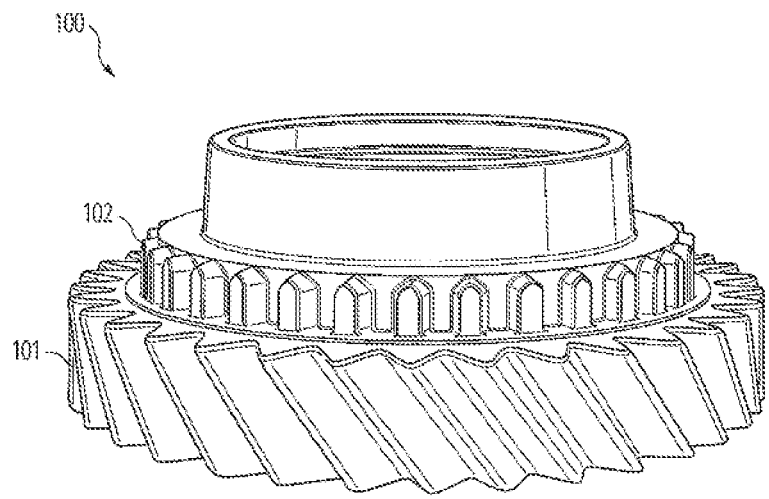
FIG. 2 shows a preferred embodiment of a gearwheel according to the invention in the form of a gear ratio wheel that can be produced by means of a method according to the invention.

FIG. 2 shows an exemplary embodiment of a gearwheel according to the invention in the form of a gear ratio wheel 100 that can be produced by means of a method according to the invention.

The gearwheel 100 is produced as an integral monobloc and comprises a running tooth system 101 and a clutch tooth system 102. As is readily apparent in FIG. 2, the clutch tooth system 102 is accessible in an axial direction only from the opposite side from the running tooth system 101, and therefore it is at any event not possible, by means of a forming tool—here a forging tool—moved only axially, to form corresponding undercuts or recessed areas on the clutch tooth system 102. To form an undercut or recessed area, it was hitherto possible to resort to the radially closing sliding elements shown in FIG. 1.

Figure 3:
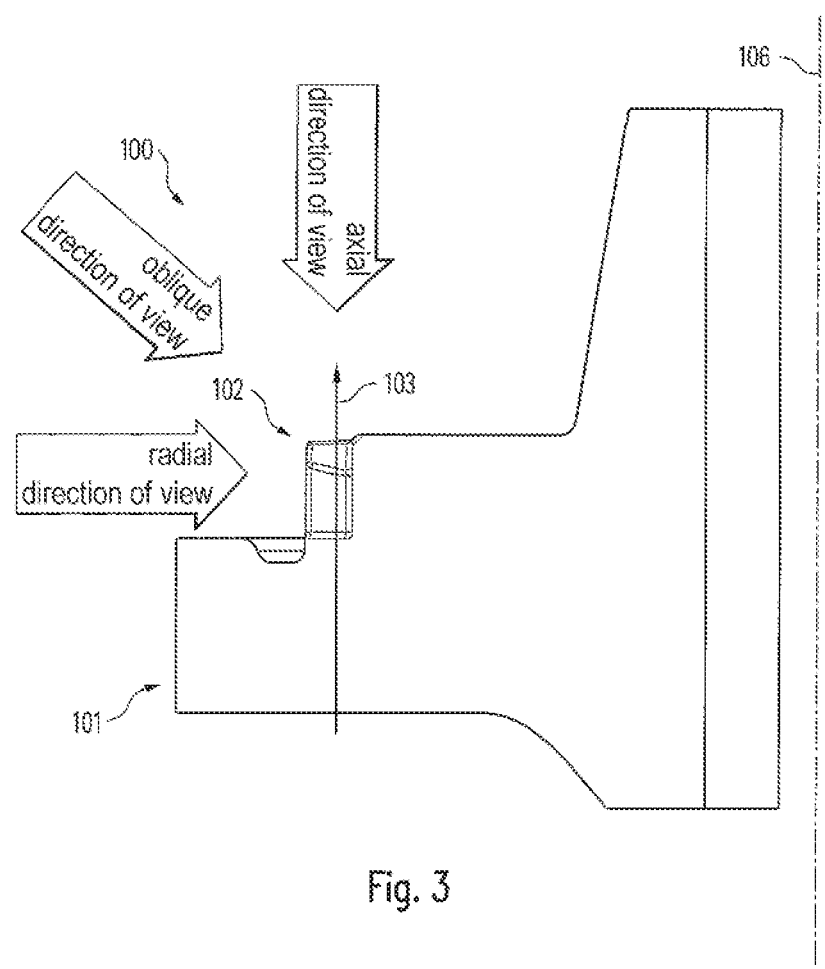
FIG. 3 shows a schematic cross-sectional view of part of the clutch gearwheel shown in FIG. 2.
Figure 4:
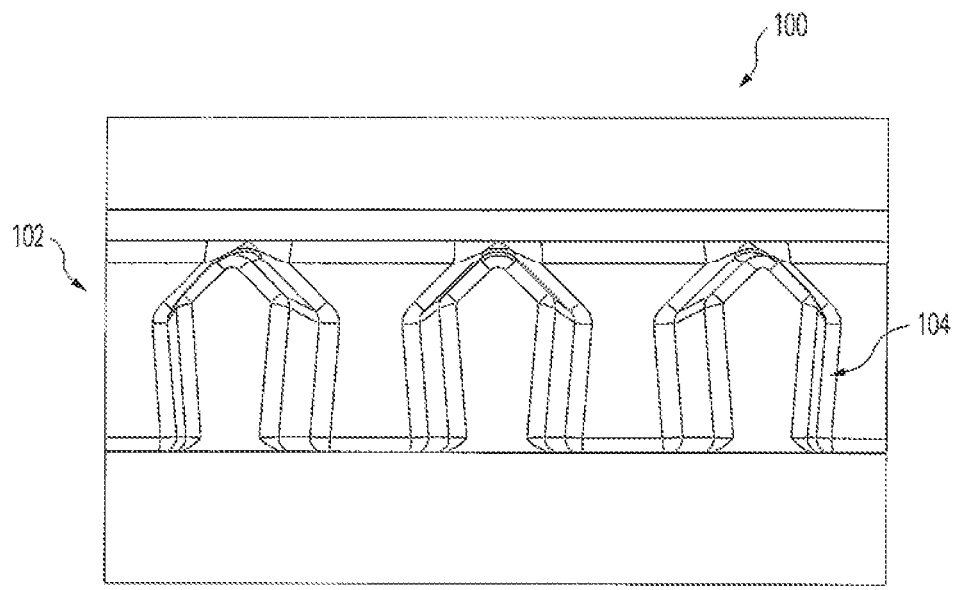
FIG. 4 shows a schematic side view, in a radial direction of view, of the clutch gearwheel shown in FIG. 3.

FIGS. 3 to 6 show partial views of the gear ratio wheel 100 shown in FIG. 2 having axial undercuts 104 on the clutch tooth system 102. As shown in FIG. 3, the clutch tooth system 102 of the finished gear ratio wheel 100 is preferably arranged substantially parallel to the vertical 103, which is parallel to the axis of rotation 106 of the gear ratio wheel 100.

Figure 5:
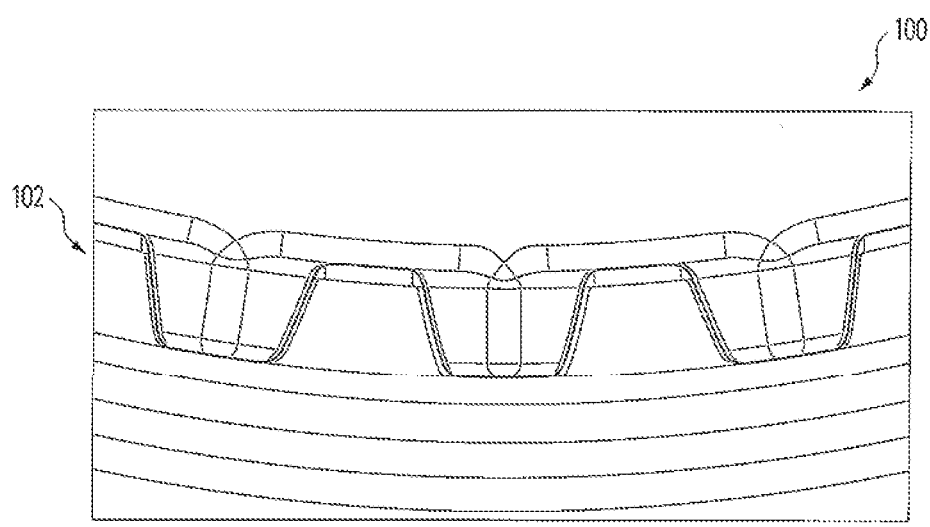
FIG. 5 shows a schematic plan view, in an axial direction of view, of the clutch gearwheel shown in FIG. 3.
Figure 6:
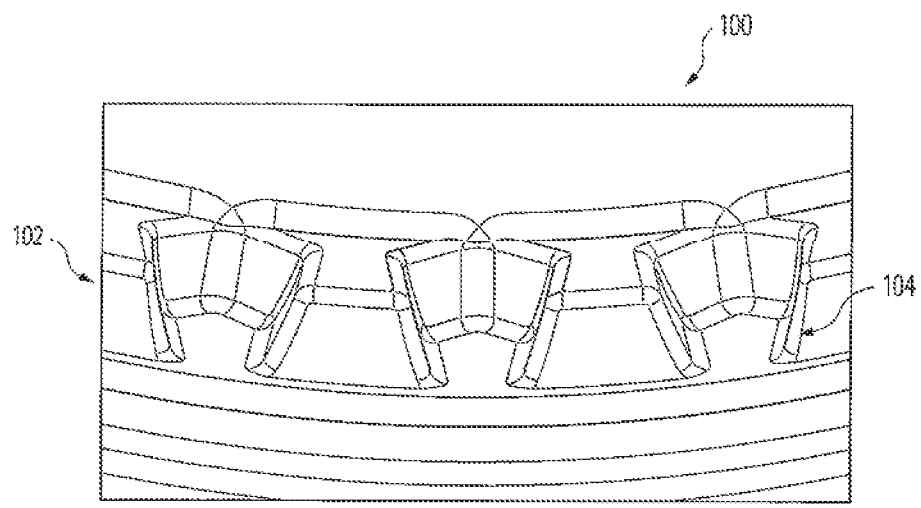
FIG. 6 shows a schematic view, in an oblique direction of view, of the clutch gearwheel shown in FIG. 3.

However, as can be seen from FIG. 5, which shows an axial direction of view of the tooth system 102 shown in FIG. 3, the axial undercuts 104 cannot be provided by a forging tool which is moved in an exclusively axial direction. It has been found that, at a certain oblique angle of viewing the teeth toward the axis of rotation 106 (cf FIG. 6: oblique angle of viewing the tooth system 102 shown in FIG. 3; angle not to scale), it is possible to look along the undercut tooth flanks. Admittedly, a forging tool cannot be moved effectively in a corresponding manner along a, as it were, tapered path of movement for the sizing blow. This is because it is only after a certain slope angle/tilt of a forging tool relative to the clutch tooth system 102 that the axial undercuts 104 could be produced, virtually without undercuts, in this oblique arrangement (cf FIG. 6) since, in such an oblique arrangement, a forging tool would be able to advance and to be moved back out again substantially completely along the tooth flanks of the clutch tooth system 102. However, the tool would have to be provided in segmented form owing to the teeth being provided in an encircling arrangement and owing to the specific pressing direction for each tooth. Moreover, it would be necessary to use a multidirectional press, which would entail considerable expenditure on production.

Figure 7:
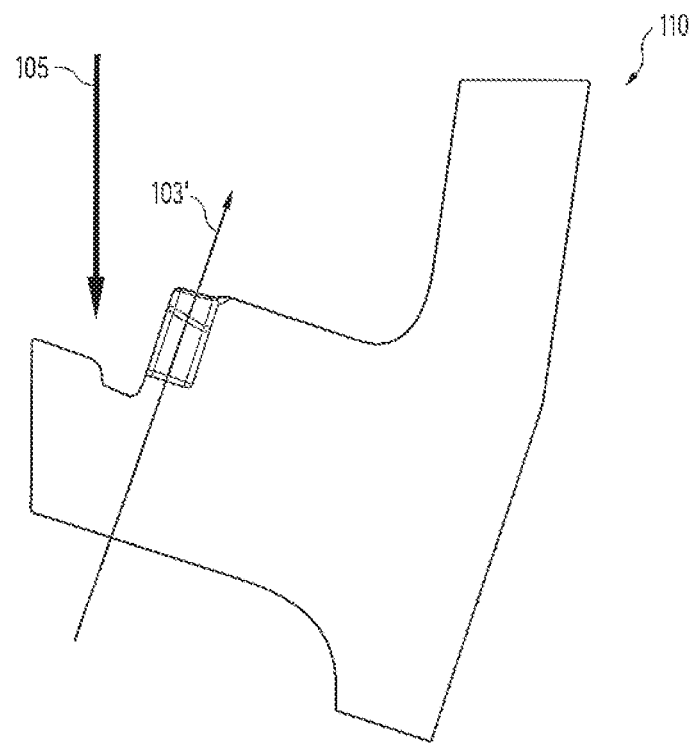
FIG. 7 shows a schematic cross-sectional view of the clutch gearwheel shown in FIG. 3, with teeth "tilted up".

In order to be able to make use of this newly won insight, the present invention now proposes, in a first step, to provide the (gearwheel) blank 110 shown in FIG. 7. At least a preliminary form of the clutch tooth system 102 is already provided on the blank 110, wherein preliminary forms of axial undercuts can also already be provided on the clutch tooth system 102. The blank 110 is preferably produced by a hot forming method, e.g. a hot pressing method, such as press forging.

In other words, the clutch tooth system 102 is first of all tilted, as it were "tilted up" in the view shown, more specifically in such a way that a forging tool can advance substantially completely along the tooth flank sides of the clutch tooth system 102 by means of an axial linear motion (indicated by arrow 105). Thus, when looking at the gearwheel in an axial direction, the above-described "oblique" angle of viewing is provided all round.

The teeth on the blank 110 are preferably provided so as to slope at an angle greater than 10°, preferably greater than 15°, to the vertical axis of rotation 106. As a particularly preferred option, the teeth are provided so as to slope at an angle of about 18° to the axis of rotation. As is clearly apparent in FIG. 7, this is the angle enclosed between the axial linear motion of the forging tool (cf arrow 105) and the axes of symmetry 103' of the teeth of the clutch tooth system 102.

By means of a first axial forming operation, in particular a first axial forging blow (cf arrow 105), particularly preferably a cold sizing blow, the subsequent undercuts 104 can now be introduced without an undercut on the tooth flank sides of the teeth of the clutch tooth system 102 or (re-)sized for accuracy (if the blank has already been provided with corresponding preliminary forms).

In a further step, the teeth of the clutch tooth system 102 (or the region in which the clutch tooth system 102 is provided) are bent from the arrangement shown in FIG. 7 into the arrangement shown in FIG. 3 by means of a second forming operation, likewise preferably a cold sizing blow. During this process, the clutch tooth system 102 is preferably bent (bent downwards in the view shown) in such a way that the axes of symmetry 103' of the teeth coincide with the vertical 103 shown in FIG. 3, with the result that the axes of symmetry 103' are essentially parallel to the axis of rotation of the gear ratio wheel 100. Because of the elastic behavior of the material during bending, it may be necessary to bend it back by an angle greater than the tilt angle designated above in order to bring the teeth into the desired position.

After the second bending operation or second forging blow has been performed, the teeth of the clutch tooth system 102 have at least one axial undercut 104, preferably with an undercut angle of between 1.0° and 5.0°, particularly preferably of between 1.5° and 3.5° and more preferably of about 2° to the axis of rotation 106 or to a vertical 103 parallel with the axis of rotation 106. Here, an undercut angle should be understood to mean the angle between a tooth flank side and the axis of rotation 106 (which is parallel to the vertical 103 shown). The undercut 104 is clearly visible in FIG. 4, which shows a radial direction of view of the tooth system 102 shown in FIG. 3.

By means of the method according to the invention, there is thus the possibility of forming axial undercuts 104 in teeth without having to resort to radially closing slide elements. The present invention is not restricted to the illustrative embodiment described above as long as it is included by the subject matter of the following claims. In particular, the present invention is not restricted to a method for producing a gear ratio wheel. The present invention is also not restricted to gearwheels with external tooth systems.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing a gearwheel having an axis of rotation and having at least one tooth system, teeth of the at least one tooth system having at least one axial undercut on tooth flank sides thereof, the method comprising:
   providing a blank having a tooth system, teeth of the tooth system being provided so as to slope relative to the axis of rotation such that a forming tool advances substantially fully into the tooth flank sides of the teeth through an axial linear motion along an axis of rotation;
   performing a first axial forming operation via which a preliminary form of the at least one axial undercut is formed on the tooth flank sides or an already existing preliminary form of the at least one axial undercut is sized for accuracy; and
   performing a second forming operation via which the teeth of the tooth system are bent in such a way that the at least one axial undercut is provided on the tooth flank sides and axes of symmetry of the teeth are parallel with the axis of rotation.

2. The method according to claim 1, wherein the tooth system is an external tooth system.

3. The method according to claim 1, wherein the gearwheel is a clutch gearwheel having a running tooth system and a clutch tooth system or a gear ratio wheel.

4. The method according to claim 3, wherein the teeth of the clutch tooth system are axially accessible for the forming tool in the form of a forging tool from only one component side.

5. The method according to claim 1, wherein the gearwheel is a gear shift sleeve.

6. The method according to claim 1, wherein the blank is provided by a hot pressing method or by a forging press operation.

7. The method according to claim 1, wherein the blank is provided by, and the forming operations are performed by, a warm process.

8. The method according to claim 1, wherein the gearwheel is an integral monobloc gearwheel.

9. The method according to claim 1, wherein the teeth on the blank are provided so as to be tilted relative to the axis of rotation at an angle greater than 10°, greater than 15°, or at an angle of about 18°.

10. The method according to claim 1, wherein, after the second forming operation has been performed, the teeth on the gearwheel have at least one undercut having an undercut angle of between 1.0° and 5.0°, between 1.5° and 3.5°, or an undercut angle of about 2° to a vertical parallel to the axis of rotation.

11. The method according to claim 1, wherein the step of performing the first axial forming operation is performed by a first forging blow.

12. The method according to claim 11, wherein the first forging blow is performed as a cold sizing blow.

13. The method according to claim 1, wherein the step of performing the second forming operation is performed by a second forging blow.

14. The method according to claim 13, wherein the second forging blow is performed as a cold sizing blow.

15. A method for producing a gearwheel having an axis of rotation and having at least one tooth system, teeth of the at least one tooth system having at least one axial undercut on tooth flank sides thereof, the method comprising:
   providing a blank already having a tooth system thereon, wherein teeth of the tooth system are tilted relative to the axis of rotation;
   performing a first axial forming operation via which a preliminary form of the at least one axial undercut is formed on the tooth flank sides, or an already existing preliminary form of an axial undercut is sized for accuracy, by advancing a forming tool fully into the tooth flank sides of the teeth in an axial linear motion along the axis of rotation; and
   performing a second forming operation via which the blank is bent in such a way that the teeth of the tooth system are modified from being tilted relative to the axis of rotation to having axes of symmetry that are parallel with the axis of rotation.

* * * * *